E. M. Chaffee,
Rubber Door Mat,
No. 19,347,   Patented Feb. 16, 1858
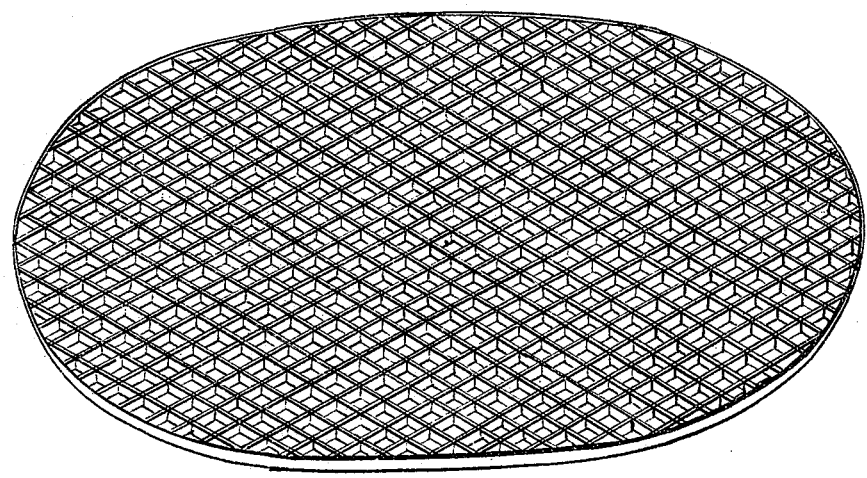

UNITED STATES PATENT OFFICE.

EDWIN M. CHAFFEE, OF PROVIDENCE, RHODE ISLAND.

INDIA-RUBBER DOOR-MAT.

Specification of Letters Patent No. 19,347, dated February 16, 1858.

*To all whom it may concern:*

Be it known that I, EDWIN M. CHAFFEE, of the city of Providence, in the State of Rhode Island, have invented and applied to use a new and useful Article of Manufacture, which I call a "Cellular India-Rubber Door-Mat," composed of india-rubber or caoutchouc and its compounds and formed from a thick sheet of the same while in a warm state by pressure upon a metallic die or mold and subjecting both to a vulcanizing temperature to cure or harden before removing the mat from its die.

The mat as I have usually constructed it consists of a sheet of rubber either with or without cloth on the back, with its whole surface covered with lozenge shaped cells, which are about one inch in length, on each side and about three eighths of an inch in depth, formed by intersecting ridges of rubber of the same depth with a breadth, on their face or upper edges of about one sixteenth of an inch, and a breadth at the bottom where they join the back of about three sixteenths of an inch, the ridges, before mentioned which partition each cell from the other, intersecting or cross each other at such an angle, as will form a lozenge shaped cell. In appearance the mat looks like a light grating, upon which the feet are cleaned while the cells contain the dirt.

The die in form is the converse of the mat having elevated instead of sunken lozenges made by planing out grooves in the metal plate, which cross each other at an angle forming the lozenge. Around the die is a hoop leaving a channel or groove between it and the lozenges by which an edge or border is formed to the mat. A sheet of rubber about one fourth of an inch thick when pressed upon the die will fill the grooves, and leave enough between the die and the platen to form the back.

When mats are desired to be placed outside the door, where they are occasionally exposed to rain, I then perforate the back to allow the water to run out, or the back may be cut out entirely or it may be made a simple grating without a back.

I do not intend to confine myself to the lozenge formed cells, as it is obvious, that square and some other forms will do as well, neither do I intend to confine myself to ribs or ridges intersecting each other as it is evident that ridges forming various figures will answer much the same purpose. Such for instance as rim circular parallel serpentine zigzag or angular or any other raised surface of rubber. Nor do I confine myself to rubber alone as the only gum, as gutta percha and other gums may be substituted for it.

What I claim and desire to secure by Letters Patent, is—

The mat as formed by ridges or grating together with the cells or spaces, of whatever form, the one to serve as scrapers to clean the feet and the other to contain the dirt, whether of rubber gutta percha or other flexible gums.

EDWIN M. CHAFFEE.

Signed in presence of—
JAMES H. PARSONS,
HORATIO ROGERS, Jun.